United States Patent Office 2,928,768
Patented Mar. 15, 1960

2,928,768

USE OF SUBSTITUTED AMINO-FORMOGUANAMINES IN DIURETIC THERAPY

Louis Freedman, Mount Vernon, and Seymour L. Shapiro, Hastings on Hudson, N.Y., assignors to U.S. Vitamin & Pharmaceutical Corporation, a corporation of Delaware No Drawing. Application September 7, 1956
Serial No. 608,435

5 Claims. (Cl. 167—65)

This invention relates to diuretic compositions containing, as the active diuretic agent, mono-substituted formoguanamines(2 - amino - 4 - substituted-amino-s-triazines) of the general formula

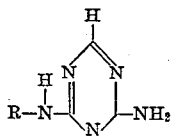

wherein R is a hydrocarbon substituent of restricted configuration.

This application is a continuation in part of our applications Serial Nos. 483,176, filed January 20, 1955, now abandoned, 410,726, filed February 16, 1954, now abandoned, and 499,538, filed April 5, 1955, now abandoned.

The unsubstituted formoguanamine, wherein R is changed to H, has been known to have some diuretic effect. Functional derivatives of formoguanamine have been associated in recent clinical tests with undesirable crystalluria (Kattus et al., Bull. Johns Hopkins Hosp. 89, 1, 1951). Efforts to improve the diuretic activity of formoguanamine (Clauder et al., Magyar Kem. Folyoirat 57, 68, 1951; C. A. 46, 4023, 1952) have revealed that compounds of the said general formula wherein R is phenyl or halophenyl, such as p-chloro- or p-bromophenyl, manifest diuretic activity far greater than that of formoguanamine.

When, however, aliphatic groups were introduced, Clauder et al. report that the diuretic effect was reduced to less than that of the formoguanamine compound containing no aliphatic substituent.

Introducing into formoguanamine certain specific aliphatic substituents at the position R in the general formula above, we have obtained greatly increased diuretic activity as compared to the best of the materials of Clauder et al. and to two standard diuretics now on the market here or abroad.

The following table gives the comparisons. It shows the dosage in mg./kg. rat subjected to the test and the percentage increase of urinary excretion in a 5-hour period over that obtained in the control test (without the administration of any diuretic).

| Value of R in General Formula | Dose, mg./kg., Rat | Diuresis, Percent Increase over Control |
|---|---|---|
| Cyclohexyl | 5 | 342 |
| n-Amyl | 1 | 319 |
| Isoamyl | 2 | 380 |
| Cyclohexylethyl | 3 | 258 |
| For Comparison: | | |
| Phenyl (Clauder et al.) | 10 | 134 |
| Mercurophylline (whole name) | 12 | 12 |
| H (formoguanamine) | 30 | 142 |
| p-Chlorophenyl (Clauder et al.) | 10 | 128 |

For such results it is essential that the hydrocarbon group substituted at R in the general formula should be selected from the following: $C_3$—$C_7$ alkyls including a methylene unit (—$CH_2$—) attached directly to the nitrogen and $C_5$—$C_7$ cycloalkyls.

The invention comprises the composition including the diuretic of the general formula shown, in which R represents one of the hydrocarbon groups stated immediately above, and an extender, a non-toxic binder carrier, or other excipient including water, a saline solution, or other innocuous solvent for the active diuretic.

The diuretics were evaluated by the standard procedure of Lipschitz et al. (J. Pharmacol. 79, 97, 1943), and similarly evaluated for comparison were the other most active guanamine diuretics previously described, as well as formoguanamine and mercurophyllin (U.S. Pharmacopeia, 14th edition, 346), the latter being one of the most generally used diuretics presently being marketed domestically.

The compound to be tested was administered to advantage in physiologic saline solution. The dosage, corresponding to the test level indicated in each case, was contained in 25 ml. of the saline solution. (Thus, a 4 mg./kg. dosage would be 4 mg. of test compound in 25 ml. of saline solution.) The saline test solution was then administered orally to rats at the level of 25 ml./kg. Thus, if a 250 g. rat received 6.25 ml. of saline solution containing 1 mg. of compound, the dosage is reported as 4 mg./kg. rat.

Similarly, control rats received 25 ml./kg. of physiologic saline only.

Twelve rats were used in each test group and each control group, and the percent diuresis noted at hourly intervals up to 5 hours. The percent diuresis is the ratio of total urine collected over the amount of saline solution administered at the initiation of the experiment. A value of 100% indicates that volume equal to the entire dose of saline was excreted as urine in the time indicated. This standard was achieved readily by the compounds of this invention, as shown in detail later herein. By contrast, formoguanamine, the most commonly clinically used guanamine diuretic, did not show a 100% response even at a dosage level of 30 mg./kg. The compounds of this invention, in some instances showed over 100% response at dosage levels as low as 1–2 mg./kg. in contrast to a failure of the most active diuretic guanamines previously reported, such as 2-amino-p-bromophenylamino-s-triazine and 2-amino-p-chlorophenylamino-s-triazine, to achieve this 100% level at 5 mg./kg. and 10 mg./kg., respectively. Both of these compounds also proved to be lethal to some of the rats at the test levels indicated. None of the selected compounds of this invention even when tested at considerably higher doses showed such toxicity.

The general overall lack of toxicity of the selected compounds of this invention is also evident from the following data wherein dosage levels above that needed for 100% diuresis in 5-hour experiments were used.

The diuretic compound 2-amino-4-cyclohexylamino-s-triazine was administered orally as its hydrochloride each working day to a group of 16 rats at 3.5 mg./kg. and at 7.5 mg./kg., in each case for a period of 6 weeks. No untoward symptons were noted. The animals grew well in both groups with no essential difference compared to the controls. Water intake was higher than in the controls, illustrating the dehydrating capacity of the diuretic. Chronic toxicity tests in dogs performed at the dosage level of 10 mg./kg. daily (each working day) for a period of 16 weeks also showed no toxicity.

The compound 2-amino-4-isoamylamino-s-triazine was orally administered as its hydrochloride each working day for a period of 6 months to groups of 20 rats at 5 and 20 mg./kg. No untoward symptoms or toxicity were noted.

When the compound 2-amino-4-cyclohexylamino-s-triazine was administered orally as its hydrochloride, at an average dose of 300 mg. daily to 26 cardiac patients, 50% of whom had been under observation for 1 year, 23 patients maintained or lost weight (both being the desired clinical response), 1 showed inadequate diuresis, 1 was in severe cardiac failure during the testing period, and 1 showed an unreliable result due to patient taking many other drugs.

Thus our compositions are non-toxic diuretics effective at extremely low dosage levels.

PREPARATION OF DIURETIC AGENTS

The compounds of this invention may be used in the form of the free base. The preferred forms, however, are the freely soluble salts of the base with non-toxic mineral acids such as hydrochloric, sulfuric, phosphoric, and the like.

The new compounds of this invention may be prepared by technique that is conventional in the preparation of other substituted formoguanamines. The substituted biguanide hydrochloride containing the hydrocarbon substituent desired in the finished product is prepared by fusing the corresponding substituted amine hydrochloride with dicyandiamide in the temperature range 130°–190° C. for 1–2 hours. The substituted biguanide hydrochloride so produced is then isolated from the cooled melt by crystallization. The three steps are illustrated by the following equations.

*Equation 1*

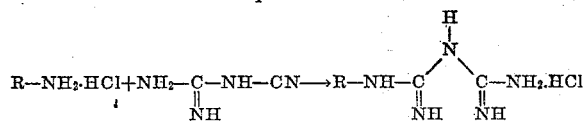

The hydrochloride is then suspended in a non-aqueous inert solvent (such as methanol, ethanol, butanol, acetonitrile or hexane) and treated with an equivalent amount of a metal alkoxide (such as sodium methylate or ethylate) yielding the free base of the substituted biguanide.

*Equation 2*

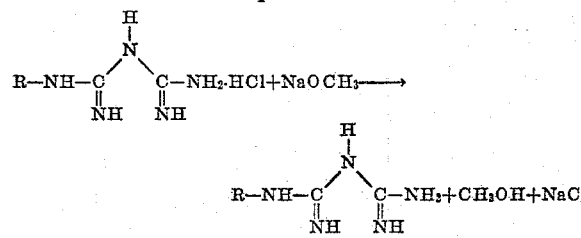

The resulting substituted biguanide is not isolated but is treated with a source of formate (such as methyl formate, ethyl formate, propyl formate or ethylene diformate) which causes cyclization to the desired substituted guanamine.

*Equation 3*

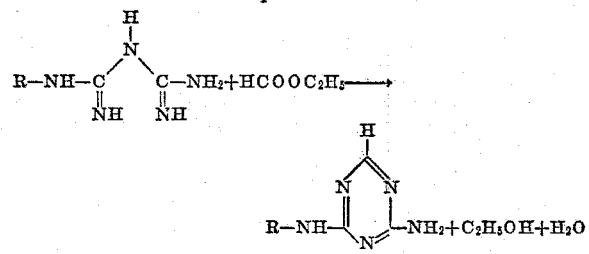

Alternatively the purification and isolation of the substituted biguanide hydrochloride is not required after the reaction shown in Equation 1. The cooled melt after fusion may be suspended in methanol or like solvent and treated as indicated in Equations 2 and 3, to give the desired guanamine.

Our new compounds were prepared by one or both of these processes.

The primary or secondary amines required as initial reactants for preparing the compounds of this invention are available commercially or prepared by known techniques.

EVALUATION OF DIURETIC ACTIVITY

Our diuretics were administered orally in physiologic saline solution at the level of 25 ml. of the solution per kg. weight of rat. At least 12 rats were used for each individual test and the Lipschitz technique was followed throughout.

The major table that follows shows the specific hydrocarbon group that is substituted at R in the general formula in column 1 hereof, to give the diuretic agent tested, the melting point of the agent after solvent recrystallization before use, the dosage mg. dry weight of the active diuretic agent per kg. of rat, and the volume of urine collected (diuresis) in 5 hours as the percentage of the volume of the said solution administered.

Tests showing "0" dosages were controls in which the same volume of liquid (saline solution) was administered without any diuretic.

Combustion analyses, made for each compound, show percentages of carbon and hydrogen that agree satisfactorily with the theory but are omitted from the table for simplification. Omitted also are the volumes of urine noted in each case at 1, 2, 3, and 4 hours.

In all our diuresis tests, small differences in urine collected are not significant because of unexplained variations in animal behavior. These variations occur in the controls as well as for the rats receiving the diuretic compositions. The variations are not always in the same direction.

Five "Comparison Compounds" that are no part of this invention were tested also, with the results shown in the last lines of the table.

PHARMACOLOGICAL TESTS

| R | M.P., °C. | Dosage, mg./kg., Rat | Diuretic Excretion, Percent, in 5 Hrs. |
|---|---|---|---|
| n-propyl | 163–5 | 5 | 96 |
| control | no diuretic | 0 | 14 |
| n-butyl | 140–3 | 3 | 117 |
|  |  | 0 | 36 |
| isobutyl | 125–7 | 3.5 | 100 |
|  |  | 0 | 26 |
| n-amyl | 115–8 | 1 | 102 |
|  |  | 0 | 24 |
| Do | | 0.5 | 90 |
|  |  | 0 | 59 |
| 2-methylbutyl | 123–4 | 5 | 112 |
|  |  | 0 | 37 |
| Do | | 4 | 122 |
|  |  | 0 | 40 |
| isoamyl | 125–9 | 2 | 110 |
|  |  | 1 | 80 |
| Do | | 0 | 23 |
| n-hexyl | 120–2 | 7.5 | 103 |
|  |  | 0 | 41 |
| 4-methylamyl | 129–30 | 20 | 108 |
| Do | | 5 | 93 |
| Do | | 3 | 71 |
| n-heptyl | 120–1 | 1 | 82 |
|  |  | 0 | 87 |
| cyclopentyl | 161–2 | 2 | 99 |
|  |  | 0 | 34 |
| cyclopentylmethyl | 141–3 | 4 | 103 |
|  |  | 2 | 95 |
| Do | | 0 | 33 |
| cyclohexyl | 162–4 | 8 | 113 |
|  |  | 0 | 16 |
| Do | | 5 | 101 |
|  |  | 0 | 40 |
| Do | | 5* | 109 |
|  |  | 0 | 25 |
| cyclohexylmethyl | 159–62 | 4 | 128 |
|  |  | 0 | 46 |
| cyclohexylethyl | 162–4 | 10 | 100 |
|  |  | 0 | 22 |
| Do | | 3 | 61 |
|  |  | 0 | 17 |
| cycloheptyl | 142–4 | 10 | 107 |
| Do | | 5 | 62 |

PHARMACOLOGICAL TESTS

| R | M.P., °C. | Dosage, mg./kg., Rat | Diuretic Excretion, Percent, in 5 Hrs. |
|---|---|---|---|
| Comparison Compounds: | | | |
| phenyl | | 10 | 84 |
| Do | | 5 | 52 |
| | | 0 | 36 |
| Cl—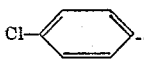 | | 10 | 95 |
| Some animals on 10 mg./kg. dose died after 72 hours | | 0 | 42 |
| Br—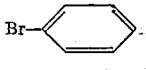 | | 5 | 82 |
| Some animals on 5 mg./kg. dose died after 72 hours | | 0 | 37 |
| | | 12 | 12 |
| Mercurophylline (whole compound, not substituent group). | | 6 | 12 |
| | | 0 | 19 |

SPECIFIC EXAMPLES

The following examples serve to illustrate our substituted formoguanamines and the methods we have used to prepare them. In these examples and elsewhere herein proportions of materials are expressed as parts by weight unless specifically stated to the contrary.

Example I (a) PREPARATION OF $N^1$-CYCLOHEXYLBIGUANIDE HYDROCHLORIDE

Twenty-seven grams (0.2 m.) of cyclohexylamine hydrochloride, and 16.8 g. (0.2 m.) of dicyandiamide were intimately ground together, transferred to a flask and heated slowly by means of an oil bath to 150–160° C., and maintained at this temperature for 30 minutes. The melt was allowed to stand until cooled and then dissolved in methanol. The crude product formed crystals melting at 200–210° C. On recrystallization from water, the melting point was raised to 221–223° C.

Theoretical for $C_8H_{18}N_5Cl$: C, 43.75%; H, 8.22%. Found: 43.41%; H, 8.22%.

(b) CONVERSION OF $N^1$-CYCLOHEXYLBIGUANIDE HYDROCHLORIDE TO 2-AMINO-4-CYCLOHEXYLAMINO-S-TRIAZINE

A solution of 2.3 g. (0.1 g. atom) of sodium in 80 ml. of methanol was prepared, and 22 g. (0.1 mole) of $N^1$-cyclohexylbiguanide hydrochloride added, followed by addition of 8 ml. of ethyl formate. The reaction mixture was maintained at room temperature for 18 hours and then treated with 50 ml. of water. On standing, a white precipitate of the product formed giving a yield of 10 grams or 52% of theory. The product had a melting point of 157–163° C.

Example II

PREPARATION OF 2-AMINO-4-CYCLOHEXYLAMINO-S-TRIAZINE FROM CYCLOHEXYLAMINE HYDROCHLORIDE

Twenty-seven grams (0.2 m.) of cyclohexylamine hydrochloride, and 16.8 g. (0.2 m.) of dicyandiamide were intimately ground together, heated slowly in a Pyrex retort in an oil bath to 150–160° C., and maintained at this temperature for about 5 hours. The reaction mixture was cooled, dissolved in 100 ml. of methanol, and the resulting solution filtered. The clear solution was added to a solution of 3.45 g. (0.15 g. atom) of sodium in 100 ml. of methanol. The reaction mixture was cooled and, after addition of 15 ml. (0.19 mole) of ethyl formate, was maintained at room temperature overnight. The reaction mixture was then diluted with water and allowed to stand, whereupon the crude product, which crystallized out, gave a yield of 17.5 g. (45.5% of theory). After recrystallization from acetonitrile, it melted at 162–164° C.

Theoretical for $C_9H_{15}N_5$: C, 55.93%; H, 7.82%; N, 36.2%. Found: C, 55.81%; H, 7.85%; N, 36.1%.

A mixed melting point with the final product of Example I, showed no depression of the melting point indicating the two compounds are identical.

We have also made and tested, for diuretic purposes, various organic compounds and salts of the base of our preferred products.

Example III

HYDROCHLORIC ACID SALT

The hydrochloride of our new triazine base was prepared by neutralizing a weighed amount of the base with a stoichiometric amount of hydrochloric acid, isolating the acid salt by conventional evaporation on a steam bath, and recrystallizing it from dioxane or isopropyl alcohol. The hydrochloride melts at 215° C. It is soluble in water at room temperature to the extent of at least 25%.

Theoretical for $C_9H_{16}N_5Cl$: C, 47.0%; H, 6.97%; N, 30.5%. Found: C, 46.84%; H, 6.88%; N, 31.0%.

Example IV

2-AMINO-4-NORMAL-AMYLAMINO-S-TRIAZINE

A mixture of 6.2 grams (0.05 m.) of n-amylamine hydrochloride and 4.2 grams (0.05 m.) of dicyandiamide was heated in an oil bath, fused, and maintained for ¾ hour at 155–160° C. The molten mass was cooled and then dissolved in 75 ml. of methanol and filtered. To the filtrate was added a solution of 1.15 grams (0.05 g. atom) of sodium in 35 ml. of methanol, after which were added 4 ml. (0.05 m.) of ethyl formate. After standing 48 hours the reaction mixture was decanted into twice its volume in water. The yield of product, which crystallized out on standing, was 4 grams (44%). Recrystallized from acetonitrile, it melted at 115–118° C.

The product was also characterized by the preparation of a picrate of melting point 148° C.

Theoretical for $C_{14}H_{18}N_8O_7$: C, 40.99%; H, 4.43%. Found: C, 41.20%; H, 4.63%.

The ultraviolet absorption spectrum of the free base determined in methanol shows a minimum at 246 millimicrons and a maximum at 263–264 millimicrons with the molar extinction of 4,070.

The yield in this example is calculated on the basis of the amine hydrochloride used.

Example V

2-AMINO-4-N-AMYLAMINO-S-TRIAZINE HYDROCHLORIDE

Although the hydrochloride of the triazine base may be prepared through reaction of aqueous hydrochloric acid with the free base, we have found that it can be obtained directly without isolation of the free base, as follows:

A mixture of 400 grams (3.23 m.) of n-amylamine hydrochloride and 275 grams (3.28 m.) of dicyandiamide was heated in an oil bath. After the reaction temperature reached 150° C., it was maintained at that level for 1 hour. After cooling of the reaction product, a solution of 74.6 grams (3.23 g. atoms) of sodium in 1660 ml. of methanol was added and the sodium chloride thus formed was filtered from the solution. The filtrate was mixed with 195 grams (3.25 m.) of methyl formate and the mixture allowed to stand 24 hours. The reaction mixture was then treated with mixed methanol and hydrochloric acid (1:1) in amount to establish the pH at about 1.7. The methanol was then distilled off in vacuo. The residue from distillation, 987 grams was dissolved in 6 liters of water and filtered from undesired insoluble by-products. The filtrate was made alkaline with concentrated ammonium hydroxide. The free base which precipitated was filtered off and dried. The base was suspended in 3,855 ml. of isopropanol and the pH adjusted to 1.7 with 1:1 isopropanol and aqueous hydrochloric acid solution, the whole filtered, and the clear filtered solution concentrated to the point of crystallization. Upon standing there was obtained 225.5 grams of pure product, M.P. 208–210° C.

Theoretical for $C_8H_{16}N_5Cl$: C, 44.16%; H, 7.40%; Cl, 16.29%. Found: C, 44.41%; H, 7.34%; Cl, 15.97%.

*Example VI*

2-AMINO-4-ISOAMYLAMINO-S-TRIAZINE

A mixture of 6.2 grams (0.05 m.) of isoamylamine hydrochloride and 4.2 grams (0.05 m.) of dicyandiamide was heated in an oil bath, fused and maintained for about 1 hour at 170–180° C. After cooling, the reaction mixture was dissolved in 75 ml. of methanol and filtered. The filtrate was treated with a solution of 1.15 grams (0.05 g. atom) of sodium in 35 ml. of methanol, followed by 4 ml. (0.05 m.) of ethyl formate. After standing 48 hours, the reaction mixture was decanted into twice its volume of water and the product allowed to precipitate. There was obtained a yield of 2.6 grams of white solid (29%) which, upon recrystallization from acetonitrile, melted at 125–127° C.

The product was also characterized by the preparation of a picrate of M.P. 185° C.

Theoretical for $C_{14}H_{18}N_8O_7$: C, 40.99%; H, 4.43%. Found: C, 40.46%; H, 4.60%.

The ultraviolet absorption spectrum of the free base determined in methanol shows a minimum at 248 millimicrons and a maximum at 263–265 millimicrons, with the molar extinction coefficient of 4,000.

*Example VII*

2-AMINO-4-ISOAMYLAMINO-S-TRIAZINE HYDROCHLORIDE

A mixture of 611 grams (5.6 m.) of isoamylamine hydrochloride and 472 grams (5.6 m.) of dicyandiamide was heated in an oil bath. Upon fusion at 125° C. an exothermic reaction started and the crystallization of the isoamylbiguanide hydrochloride resulted. To the product after cooling a solution of 129 grams (5.6 g. atoms) of sodium in 2600 ml. of methanol was added. The solution dissolved the fused mass. The sodium chloride formed was filtered off. The filtrate was treated with 330 grams (5.5 m.) of methyl formate. The reaction mixture, after standing 24 hours, was treated with methanol and hydrochloric acid mixture (1:1) to make the pH 1.4, and the methanol distilled off in vacuo. The somewhat moist residue weighing 1554 grams was dissolved in 4500 ml. of water and filtered from undesired by-products. The filtrate was made alkaline with concentrated ammonium hydroxide. The free base which precipitated was filtered off, suspended in 1812 ml. of isopropanol, and adjusted to pH 1.4 with 1:1 isopropanol and hydrochloric acid. The solution of the hydrochloride was concentrated by evaporation. The solid which separated was recrystallized from isopropanol. There was obtained a yield of 326 grams (26.8%) of pure product, M.P. 203–205° C.

Theoretical for $C_8H_{16}N_5Cl$: C, 44.16%; H, 7.40%; N, 32.18%; Cl, 16.29%. Found: C, 44.01%; H, 7.49%; N, 32.20%; Cl, 16.40%.

*Example VIII*

2-AMINO-4-METHYLBUTYLAMINO-S-TRIAZINE

A mixture of 6.2 grams (0.05 m.) of 2-methylbutyl amine hydrochloride and 4.2 grams (0.05 m.) of dicyandiamide were heated in an oil bath, fused, and heated to 157° C. After about 20 minutes, reaction occurred and crystallization of the 2-methylbutylbiguanide hydrochloride resulted. After cooling, the reaction mixture was dissolved in 75 ml. of methanol and filtered. The filtrate was treated with 1.15 grams (0.05 g. atom) of sodium in 35 ml. of methanol followed by 4 ml. (0.05 m.) of ethyl formate. After standing 48 hours, the reaction mixture was decanted into twice its volume of water and the product allowed to precipitate. There was obtained 5.2 grams (yield 58%) of product which, upon recrystallization from acetonitrile, melted at 123–124° C.

Theoretical for $C_8H_{15}N_5$: C, 53.01%; H, 8.34%. Found: C, 52.94%; H, 8.36%.

*Example IX*

2-AMINO-4-N-HEPTYL, CYCLOPENTYLMETHYL, OR CYCLOHEXYLETHYL-SUBSTITUTED-AMINO-S-TRIAZINE

The procedure of Example VIII is followed exactly, except that the 2-methylbutyl amine hydrochloride is substituted, in turn, by 0.05 mole of each of the following:

(a) n-heptyl amine hydrochloride
(b) cyclopentylmethyl amine hydrochloride
(c) cyclohexylethyl amine hydrochloride The melting points and analyses (found and theory) for the resulting recrystallized products, designated by the value for R in the general formula of column 1, were found to be as follows:

| R in General Formula | M.P., °C. | Percent Carbon | | Percent Hydrogen | |
|---|---|---|---|---|---|
| | | Found | Th. | Found | Th. |
| n-heptyl | 120–1 | 57.4 | 57.4 | 9.3 | 9.2 |
| cyclopentylmethyl | 141–3 | 56.3 | 55.9 | 7.8 | 7.8 |
| cyclohexylethyl | 162–4 | 60.3 | 59.7 | 8.5 | 8.7 |

*Example X*

2-AMINO-4-NEOPENTYLAMINO-S-TRIAZINE

A mixture of 3.0 grams (0.024 m.) of neopentylamine hydrochloride (J. Am. Chem. Soc. 54, 3436, 1932) and 2.1 grams (0.025 m.) of dicyandiamide was heated in an oil bath and fused. After the mixture was heated for a few minutes at 170° C. neopentylbiguanide hydrochloride started to crystallize. Heating was continued an additional 10 minutes. Then the reaction mixture was cooled, dissolved in 75 ml. of methanol and filtered. The filtrate was treated with 0.6 grams (0.025 g. atom) of sodium in 20 ml. of methanol, followed by 2.5 ml. (0.03 m.) of ethyl formate. After standing 24 hours, the reaction mixture was diluted to twice its volume with water. Since no crystallization occurred at this point, the reaction mixture was concentrated to dryness and the residue treated with three successive 50 ml. portions of boiling benzene. Upon cooling there was obtained 2 grams (yield 45%) of product, which on recrystallization from benzene melted at 166–168° C.

Theoretical for $C_8H_{15}N_5$: C, 53.01%; H, 8.34%. Found: C, 53.56%; H, 8.35%.

*Example XI*

2-AMINO-4-SUBSTITUTED-AMYLAMINO-S-TRIAZINE

A mixture of 117 grams (0.95 m.) of mixed amyl amine hydrochloride, containing a mixture of the n-amyl, isoamyl, and 2-methylbutyl compounds, and 75.7 grams (0.9 m.) of dicyandiamide was heated in an oil bath, fused, and the temperature maintained at 175° C. for 2 hours. The reaction mixture was cooled and dissolved in 250 ml. of methanol. A solution of 23 grams (1 g. atom) of sodium in 700 ml. of methanol was added, followed by 80 ml. (1 m.) of ethyl formate. After standing 48 hours, the reaction mixture was treated with 20 grams of finely powdered ammonium chloride and filtered. The filtrate was evaporated at room temperature. It yielded a gummy white mass of the mixed amyl triazines. The white gummy solid was suspended in 250 ml. of water and 60 grams of sodium chloride added. The product was separated and this process repeated. The separated product was finally washed with water and dried, yielding 35.1 grams (20.4%) of the mixed amyl compounds. After recrystallization from acetonitrile, it melted at 94–102° C.

Theoretical for $C_8H_{15}N_5$: C, 53.01%; H, 8.34%. Found: C, 53.88%; H, 8.63%.

Example XII
HYDROCHLORIDES OF SUBSTITUTED GUANAMINES

The N-alkyl substituted formoguanamines representing the final products of Examples IV, VI and VIII to XI, or any combination of these, are mixed with 3 times their dry weights of isopropanol and then acidified to pH 1.4 by stirring in a 1:1 solution of hydrochloric acid in isopropanol. The solution of the substituted formoguanamines hydrochloride that results is subjected to evaporation to such concentration that the hydrochloride crystallizes out on cooling. The concentrated solution is cooled and the crystals that separate are removed and recrystallized from isopropanol.

Example XVI
OTHER SALTS

Salts other than the hydrochloride are made by replacing the hydrochloric acid used in any of the above examples by dilute sulfuric, phosphoric, or like non-toxic mineral acid in proportion that is stoichiometric to the substituted triazine base to be converted to the salt.

DIURETIC COMPOSITIONS

All materials described herein are to be used only on prescription by a physician. Doses of 50–500 mg. of active principle per person a day are suggested, the exact amount varying within this range with the weight of the person treated.

Before use our new compounds are compounded with an excipient.

The excipient may be a solid or a liquid.

The proportion of the excipient must be at least as large as required to separate the particles of diuretic (macroscopic, microscopic, or molecular) from each other and cause quick solution or dispersion of the said particles in the gastric juice of the stomach. When the excipient is a solid, we use about 0.3–4 parts for 1 part of the active diuretic.

The excipient to be used must be non-toxic, edible or potable, and chemically inert to the substituted triazine base providing the active diuretic principle.

*Solid.*—Examples of solid excipient that meet these requirements and that may be used are lactose, sucrose, starch, pregelatinized starch, gum arabic, gum tragacanth, acacia, and mixtures of them. Suitably the solid excipient may contain also admixed magnesium stearate, talc, corn starch, or two or more of these additives, to promote separation of the composition from the plunger and mold used in shaping the composition into tablets for use orally.

A satisfactory diuretic tablet is one made according to the following formula, mixing and pressing being effected in conventional equipment and with usual technique.

| Ingredient | Weight in Mgs. | Approximate Percentage |
|---|---|---|
| 2-Amino-4-n-amylamino-s-triazine hydrochloride | 100.0 | 61.7 |
| Sugar | 25.9 | 16.0 |
| Starch | 22.1 | 13.6 |
| Acacia | 7.8 | 4.8 |
| Talc | 3.1 | 1.9 |
| Magnesium stearate | 1.5 | 1.0 |
| Stearic acid | 1.6 | 1.0 |

In alternative tablet compositions, the triazine derivative constituting the active diuretic agent used in the tablet above is substituted by any of the other triazine derivatives described herein, on an equal weight basis. Other such derivatives that are substituted on an equal weight basis are those of the general formula of column 1 hereof in which R has any of the meanings stated, particularly cyclopentyl, cyclohexyl, and cycloheptyl; beta-phenethyl; n-heptyl; one of the cycloalkylalkyls listed earlier herein; and amyl and isoamyl.

In making our tablet of this composition, the active diuretic agent is mixed with the sugar and the gum acacia and then with the starch made previously into a paste with a small amount of distilled water. The mixture is then dried at low heat and put through a granulator. This processing disperses the particles of the said agent in the other components constituting part of the whole excipient. This mix is then blended with the talc, magnesium stearate and the stearic acid acting as mold lubricants. The whole is then mixed in a pony mixer or other suitable powder mixing equipment. The granular powder thus made and mixed is ready for tableting on any type of tableting machine or for filling into hard gelatin capsules.

*Solutions.*—As a liquid excipient, particularly for use by injection, we use to advantage water or, better, physiologic saline solution containing a bacteriostat. Bacteriostats that are suitable and illustrate the class to be used are benzyl alcohol of concentration 1% in physiologic saline solution, monochlorbutanol in 0.5% concentration, and phenyl mercuric borate 1 part by weight to 50,000 parts of the saline solution. Our alkyl substituted formoguanamines as the hydrochlorides are dissolved, separately or mixed, in such liquid excipient and in proportion to make the final concentration of active diuretic agent about 5–10%. Higher concentrations of the diuretic are unnecessary. Lower concentrations require use of unnecessarily large volumes of solutions.

In making solutions, the new compounds of this invention dissolve readily in water or isotonic sodium chloride solution.

Solutions of these products suitable for injection are prepared by dissolving 5 grams of the hydrochloride in 100 ml. of physiological saline and rendering the solution sterile by Berkefeld filtration. The solutions are then sterile-filled into ampules or into multiple dose vials. The inclusion of a bacteriostat of kind described ensures sterility and stability over long periods of shelving before final use.

Solutions in water are similarly prepared.

Solutions may be prepared in like manner from the pure free bases using calculated quantities of the bases and of aqueous hydrochloride or other non-toxic mineral acid.

It will be understood that it is intended to cover all changes and modifications of the examples of the invention herein chosen for the purpose of illustration which do not constitute departures from the spirit and scope of the invention.

What we claim is:

1. A process for the application of diuretic therapy to human beings which includes administering a composition comprising a diuretic agent selected from the group consisting of monosubstituted formoguanamines having the formula

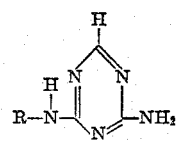

in which R is a monovalent hydrocarbon radical selected from the group consisting of alkyl groups having from three to seven carbon atoms and attached to the nitrogen through a methylene ($CH_2$) unit and cycloalkyl groups having from five to seven carbon atoms, and salts thereof with nontoxic mineral acids.

2. A process in accordance with claim 1 in which the R of the formoguanamine is isoamyl.

3. A process in accordance with claim 1 in which the R of the formoguanamine is cyclohexyl.

4. A process in accordance with claim 1 in which the composition includes a nontoxic excipient mixed with the said agent in the proportion of from 0.3 to 4 parts by weight for each part of the said agent, the excipient being selected from the group consisting of lactose, sucrose, starch, pregelatinized starch, gum arabic, gum tragacanth, and acacia.

5. A process in accordance with claim 1 in which the diuretic agent is in physiological saline solution.

References Cited in the file of this patent

FOREIGN PATENTS

| | | |
|---|---|---|
| 1,007,003 | France | Apr. 30, 1952 |
| 168,063 | Austria | Apr. 10, 1951 |

OTHER REFERENCES

Chem. Abst., vol. 46, pp. 4023–24 (1952), (Abst. of Clauder et al., Magyar Kem. Folyoirat, vol. 57, p. 68, 1951).

Hayman: Am. J. Phar., pp. 72–74, February 1950.

Waksman: Antibiotics and Chemother., pp. 333–346, p. 341 pert., April 1953.

Molitor: J. Pharmacol. and Exp. Ther., pp. 1–49, p. 47 pert., April 1950.

Welch: J. Lab. and Clin. Med., 35:5, May 1950, pp. 663–666.

Kattus et al.: Bull. Johns Hopkins Hosp., 89:1, pp. 1–8, July 1951.

Vogl: Diuretic Ther., 1953, pp. 47, 59, 179–183, Williams and Wilkins Co., Baltimore, Md.

UNITED STATES PATENT OFFICE
CERTIFICATE OF CORRECTION

Patent No. 2,928,768　　　　　　　　　　　　　　　　March 15, 1960

Louis Freedman et al.

It is hereby certified that error appears in the printed specification of the above numbered patent requiring correction and that the said Letters Patent should read as corrected below.

Column 1, lines 19 to 24, the formula should appear as shown below instead of as in the patent:

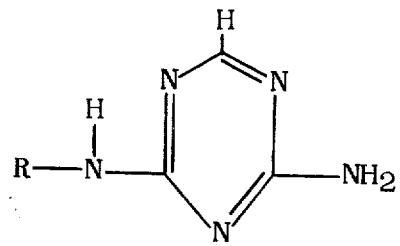

column 2, line 17, for "edition" read -- Édition --; same column 2, line 63, and column 3, line 1, for "symptons", each occurrence, read -- symptoms --; column 5, insert the following footnote below the table:

(* = Hydrochloride)

column 9, line 19, for "Example XVI", in italics, read -- Example XIII --, in italics; column 12, line 16, list of References Cited, under "OTHER REFERENCES" for "Wilkins" read -- Williams --.

Signed and sealed this 23rd day of August 1960.

(SEAL)
Attest:

KARL H. AXLINE　　　　　　　　　　　　　　　ROBERT C. WATSON
Attesting Officer　　　　　　　　　　　　　　Commissioner of Patents